Jan. 26, 1937.  F. R. CONIBEAR  2,068,656
TRAP
Filed June 24, 1936
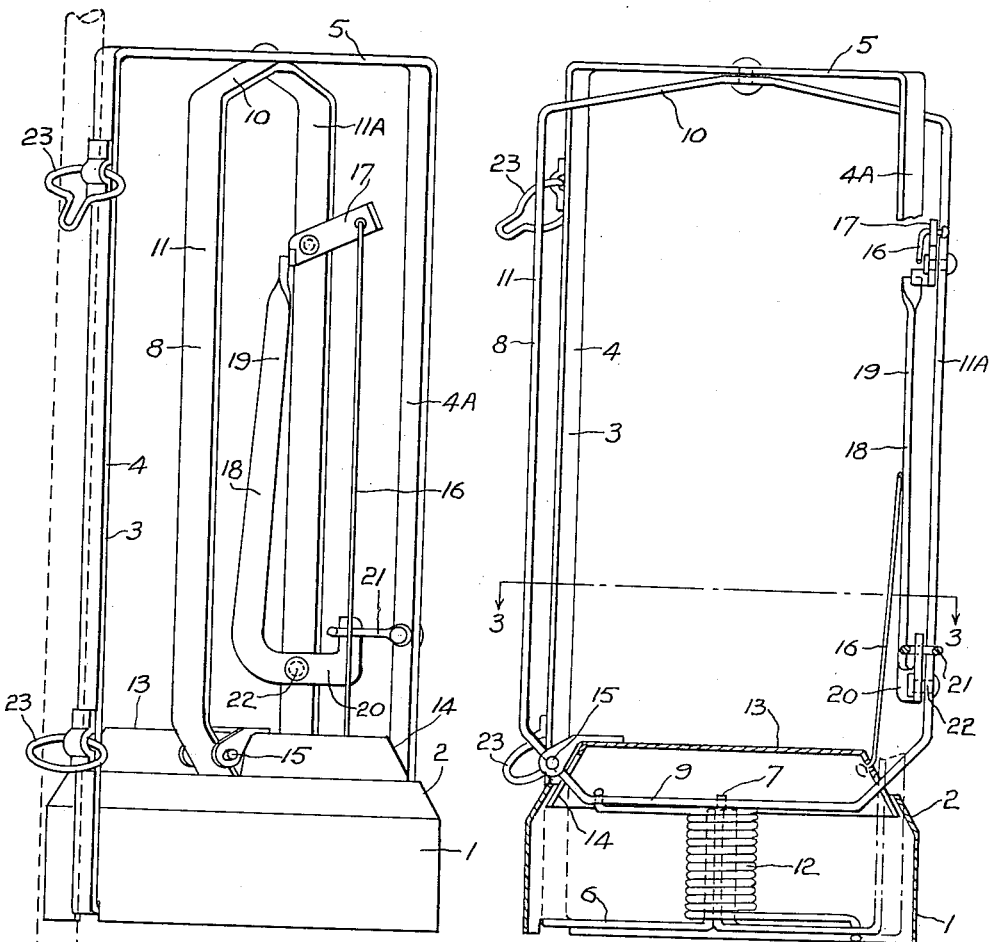
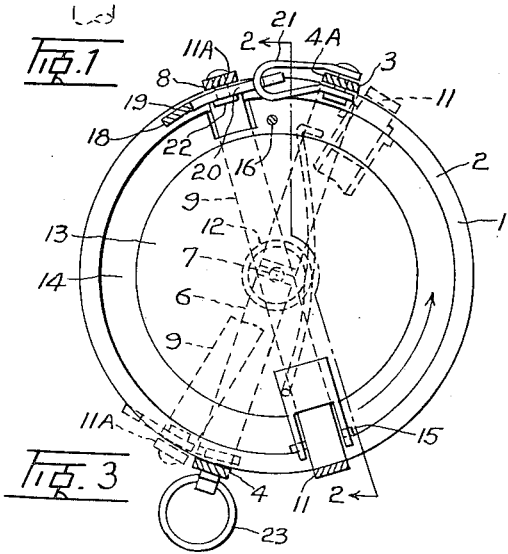
INVENTOR
FRANK RALPH CONIBEAR
BY Ernest E. Carver
ATTORNEY Patented Jan. 26, 1937

2,068,656

UNITED STATES PATENT OFFICE 2,068,656

TRAP

Frank Ralph Conibear, Victoria, British Columbia, Canada

Application June 24, 1936, Serial No. 86,977

6 Claims. (Cl. 43—90)

My invention relates to improvements in traps the objects of which are to provide means for trapping and killing an animal humanely and without damaging the fur, and to prevent any possible chance of escape of the animal. Further objects are to provide a trap which will function satisfactorily even after being partly covered by falling snow; to prevent frost below the trap from interfering with the release mechanism, and to provide means whereby the trap can be supported above ground or in water, such as in a beaver pond or in marshy ground. A further object is to provide means whereby the trap may be set to spring at or above a predetermined pressure on the trigger platform.

The invention consists essentially of a trap having a trigger release platform surmounted by a pair of vertically pivoted U-shaped frames, one of which moves under spring action to dispose its side members into close proximity to the side members of the other frame to hold and kill the animal passing through the trap, as will be more full described in the following specification and shown in the accompanying drawing:—

Fig. 1 is a general view of the trap set in position for use.

Fig. 2 is a vertical sectional view taken on the line 2—2 of Figure 3.

Fig. 3 is a plan view taken on the line 3—3 of of Figure 2.

In the drawing like characters of reference indicate corresponding parts in each figure.

The numeral 1 indicates a base which is cylindrical in form and is provided with an inturned conical flange 2. Supported from the rim of the base is a rectangular frame 3 having legs 4 and 4A and a head 5. The lower end of the legs are inturned to provide a transverse member 6 and a central stem 7 which serves as a lower pivot for a swinging frame generally indicated by the numeral 8. The frame 8 is rectangular and consists of lower and upper transverse members 9 and 10 respectively and uprights 11 and 11A, and is pivotally mounted upon the stem 7 and from the head 5 of the frame 3. Surrounding the stem 7 is a coil spring 12 which engages the transverse member 6 and the lower transverse member 9 of the swinging frame 8 to urge said swinging frame towards the "shut" position indicated by dotted lines in Figure 3.

A platform 13 having a depending conical flange 14 is hinged to the upright 11 as at 15. The flange 14 being partially housed within the flange 2 of the base 1, so that in the event of its being covered by snow it may still be free to be pressed downwards by the weight of an animal stepping on it. Opposite to the hinge 15 a pull wire 16 is connected to the platform 13 and extends upwardly to a trigger 17 which is pivotally mounted upon the upright 11A. Adjacent the lower extremity of the upright 11A is a U-shaped trip lever 18 which is provided with a long arm 19 adapted to be engaged by the trigger 17 and a short arm 20 which is adapted to be engaged by a swinging link 21 supported upon the leg 4A. The trip lever is pivotally mounted on the upright 11A on a rivet 22.

Mounted upon the leg 4 are two hinged eyes 23 which may be round or key hole shaped as desired and which serve as means for mounting the trap upon a stake thrust into the ground, as for instance when it desired to set the trap partly below the water level in a beaver pond, or for hanging the trap on the side of a tree.

The width of the swing frame 8 is equal to that of the frame 3 so that the frame 8 is prevented from turning more than half a revolution since the uprights 11 and 11A must obviously come to a stop against the legs 4 and 4A.

To set the trap, which is most easily done when it is in inverted position, the swinging frame 8 is turned upon its axis in a clockwise direction (see Figure 3), the link 21 is dropped onto the arm 20 of the trip lever 18 and the trigger 17 swung to dispose its free end in the path of movement of the long arm 19 of the trip lever.

If the trap is to be set to catch animals of heavy weight, the link 21 is brought to engage the arm 20 adjacent its free end, and if the setting is for the trapping of light animals, the link is pressed down closer to the base of the tripping lever. The action resulting from the adjustment of position of engagement between the link 21 and the arm is that when the link is in a high position, viz. engaging adjacent the free end of the arm due to the distance of the link from the fulcrum pin 22, a relatively heavy thrust is exerted between the contacting parts of the long arm 19 and of the trigger 17, so that appreciable effort is required to be applied to the platform 13 to depress it and swing the trigger 17 through the pull on the wire 16. If on the other hand the point of engagement between the link 21 and the arm 20 is near the base of the tripping lever the thrust exerted by the link between the trigger and the arm 19 will be slight, hence little pressure is required on the platform to swing the trigger and let the tripping lever swing to become detached from the link 21. As soon as the link 21 is separated from the tripping lever the spring 12 will cause the swinging frame 8 to turn upon its axis and catch the animal which has stepped upon the platform 13.

The trap is preferably placed in a position where the animal is required to pass his head through it to obtain the bait laid for him, consequently his head will project through one side of the trap when his foot treads on the platform, so that when the trap is sprung the leg 4 and the upright 11 close upon the animal's neck and the remaining leg 4A and upright 11A will close upon the body about the ribs, thus preventing free inhalation so that the breath is quickly stopped without serious pain being inflicted.

What I claim as my invention is:

1. A trap comprising a base, a stationary frame extending from the base, a second frame pivotally mounted upon the axis of the first frame and adapted to swing substantially in to contact with the stationary frame to close the trap, a spring for urging the trap from set to closed position, a platform hinged to the second frame, and rotatable therewith, means for holding the second frame in set position and means operable by the movement of the platform for releasing the holding means, said base and said platform each being circular and having a conical flange, the flange of the platform being adapted to rest when the trap is in set position within the base and substantially in contact with the underside of the flange of the base.

2. A trap comprising a base, a stationary frame extending from the base, a second frame swingingly mounted between the base and the frame, said second frame being spring tensioned to move it from set position to close into substantial contact with the stationary frame, a platform rotatable within the base, means for holding the trap in set position and means connected with the platform for disconnecting the holding means.

3. A trap having a stationary frame and a swinging frame rotatable within the stationary frame, a spring for rotating the swinging frame, each of said frames having a pair of vertical members adapted to be in set position when the vertical members of one frame are in close proximity to the vertical members of the other frame, holding means for the frames consisting of a link attached to one vertical member, a U-shaped tripping lever rockingly mounted at its base upon an adjacent vertical member, a pivotally mounted trigger upon said member, said trigger being adapted to engage one arm of the U-shaped tripping lever and said link being adapted to be engaged by the second arm of the tripping lever, a platform within the frames, and means operatively connecting the platform with the trigger to disrupt the engagement between the trigger and the tripping lever when the platform is depressed.

4. A trap as claimed in claim 3 wherein the link is pivotally connected to the vertical member and is capable of being disposed to engage the arm of the tripping lever at different distances from the fulcrum of said tripping lever.

5. In a spring trap having a base, a stationary frame and a swinging frame adapted to swing about a vertical axis within the stationary frame, said frames each having a pair of upright members, one of the vertical members of the stationary frame being provided with means for supporting the trap from a stake or other vertical support.

6. A spring trap having a cylindrical base and supporting a stationary frame, a depressible platform substantially covering one end of the base, a swinging frame spring tensioned and pivotally mounted below the platform, means for holding the frames in set position, and means operably connected with the platform to disrupt the holding means to permit the spring to close the trap.

FRANK RALPH CONIBEAR.